(12) United States Patent
Obee et al.

(10) Patent No.: US 6,358,374 B1
(45) Date of Patent: Mar. 19, 2002

(54) INTEGRATED PHOTOCATALYTIC AND ADSORBENT TECHNOLOGIES FOR THE REMOVAL OF GASEOUS CONTAMINANTS

(75) Inventors: Timothy N. Obee; Stephen O. Hay; James D. Freihaut, all of South Windsor; Joseph J. Sangiovanni, West Suffield; Robert J. Hall, West Hartford, all of CT (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/466,149

(22) Filed: Dec. 17, 1999

(51) Int. Cl.[7] ................................................ B01D 53/00
(52) U.S. Cl. .................................................. 204/157.3
(58) Field of Search .......................... 204/157.3, 157.15

(56) References Cited

U.S. PATENT DOCUMENTS 5,835,840 A * 11/1998 Goswami ................ 422/186.3

FOREIGN PATENT DOCUMENTS

| JP | 62-163730 A | * | 7/1987 |
| JP | 9-136017 A | * | 5/1997 |

OTHER PUBLICATIONS

*abstract only.*
Timothy N. Obee et al., "TiO2 Photocatalysis for Indoor Air Applications: Effects of Humidity and Trace Contaminant Levels on the Oxidation Rates of Formaldehyde, Toluene, and 1,3–Butadiene", Environmental Science & Technology, vol. 29, 1995, pp. 1223–1231. no month available.

Timothy N. Obee, "Photooxidation of Sub–Parts–per–Million Toluene and Formaldehyde Levels on Titania Using a Glass–Plate Reactor", Environmental Science & Technology, vol. 30, No. 12, pp. 3578–3584. no month available.

Robert J. Hall et al., "Photocatalytic Oxidation Technology for Trace Contaminant Control in Aircraft and Spacecraft", SAE The Engineering Society for Advancing Mobility Land Sea and Space International, 26th International Conference on Environmental Systems, Monterey, California, Jul. 8–11, 1996, 13 pages. no month available.

* cited by examiner

Primary Examiner—Edna Wong

(57) ABSTRACT

A contaminated gas that is to be cleaned, such as contaminated air, is passed through an adsorbent bed to remove gaseous contaminants. An enclosure having a fixed volume is then created around the adsorbent bed. Included within the enclosure is a photocatalytic gas purifier. The adsorbent bed is heated to release the contaminants into the fixed volume to create a high concentration of contaminants in the gas within the fixed volume. The now highly contaminated fixed volume of gas is recirculated through the heated adsorbent bed and photocatalytic gas purifier. The gas purifier oxidizes the contaminants at a high oxidation rate due to the high contaminant concentration level. The enclosure is then opened and the adsorbent bed, now regenerated and at its original temperature, is ready to again receive and clean contaminated gas.

9 Claims, 4 Drawing Sheets

INTEGRATED PHOTOCATALYTIC AND ADSORBENT TECHNOLOGIES FOR THE REMOVAL OF GASEOUS CONTAMINANTS

TECHNICAL FIELD

This invention relates to cleaning gaseous contaminants from air or from other gases.

BACKGROUND ART

Currently, methods for eliminating hazardous contaminants in indoor air use ventilation and/or air-purifiers. Ventilation can be used only where outdoor air is of sufficient quality to be considered harmless. Increased ventilation is not cost-free because the air must be conditioned: heating in the winter season or cooling and dehumidifying in the summer season.

Air-purifiers employing adsorbents to remove gaseous contaminants are readily available from a number of commercial suppliers. Typically, the commercial air-purifier design incorporates an adsorbent bed having adsorbent mass sufficient for six months or longer service period. A blend of various adsorbents necessary to treat the wide spectrum of contaminant species found in commercial and residential applications are often used. One disadvantages of this technology is that regular maintenance is required to replace the adsorbent bed. The use of larger adsorbent beds would increase maintenance intervals, but would also increase the size and cost of the apparatus. It would be most preferable to use smaller beds that require less frequent replacement or that could be regenerated without the need for removal of the bed or apparatus from its installation. A further disadvantage of current adsorbent bed technology is that it does not destroy the contaminant, but simply transfers the contaminant from the air to an adsorbent. The contaminant filled adsorbent, when filled, must be disposed of properly.

Photocatalytic air purifiers for treating indoor air pollution, such as those utilizing a porous bed of photosensitive catalyst, such as titania, exposed to ultraviolet light, represent an alternate approach to adsorbents for removing gaseous contaminants. In contrast to adsorbents, photocatalytic oxidation technology completely destroys gaseous contaminants by oxidizing them to benign products; for example, hydrocarbon contaminants are oxidized to carbon dioxide and water. Unfortunately, most contaminants are present in building air at quite small levels (less than 0.1 parts per million, by volume); and at those levels their rates of oxidation by the photocatalytic process are very slow. The slower the oxidation rate, the larger (and more expensive) the reactor needs to be.

DISCLOSURE OF THE INVENTION

A bed of material that has adsorbed therein certain contaminants from a gas stream is regenerated by heating the bed to release the captured contaminants into a fixed volume of gas that is recirculated through the heated bed and through a photocatalytic gas purifier which oxidizes the released contaminants.

Releasing the contaminants from the adsorbent bed into a fixed volume of gas increases the concentration of contaminants within that fixed volume to a level much higher than the level in the untreated contaminated air or other gas from which the contaminants were originally removed; and the rate of photocatalytic oxidation of those contaminants increases dramatically at such higher concentrations. When a sufficient amount of the contaminants within the fixed volume are destroyed by catalytic oxidation, the adsorbent bed is ready to be reused.

In an exemplary embodiment of the present invention, an adsorbent bed captures the gaseous contaminants from an external contaminated gas stream (such as the air in an office building) passed therethrough. The bed is then taken off-line by halting the flow of the external contaminated gas stream through the bed. The bed is regenerated in situ by heating the bed to release the captured contaminant into a fixed volume of gas that is recirculated through the heated bed and through a photocatalytic gas purifier which oxidizes the released contaminants. Photocatalytic oxidation is rapid due to the high concentration of contaminants in the fixed volume. The regenerated adsorbent bed is then put back on line by again passing the contaminated external gas stream through it.

The method of the present invention takes advantage of the fact that the photocatalytic oxidative process obeys the well-known Langmuir-Hinshelwood kinetics. More particularly and fortuitously, for most gaseous contaminants of concern, the rate of photocatalytic oxidation increases substantially linearly as the concentration of the contaminant increases from initial untreated levels that may be as low as or lower than 0.01 ppm up to levels of 1.0 ppm and often up to about 10.0 ppm. This can mean an increase in the rate of oxidation by a factor of 80 or more for some contaminants if their concentration levels can be increased from, for example, 0.01 ppm to 1.0 ppm. For reasons of economics it is preferred that the concentration be increased by at least a factor of ten and to at least 0.1 parts per million of volume (most preferably to at least 1.0 ppm), and to maintain that increased concentration level until at least 50% and preferably until at least 75% of the contaminants captured by the adsorbent bed is released into the recirculating gas and is photocatalytically oxidized.

During the regeneration step, as the fixed, relatively small volume of gas recirculates through the heated adsorbent bed, contaminants are released from the bed into that volume of gas, and the concentration of contaminants in the recirculating gas increases by a factor of 10 or more, and preferably by a factor of 100 to 1000 or more, as compared to the initial contamination levels in the untreated, external, contaminated gas. The final or highest concentration reached will be determined by a number of factors, including the amount of contaminant adsorbed at initiation of regeneration, the size of the fixed volume, and the temperature to which the adsorbent bed is heated during regeneration.

For most contaminants of interest, oxidation rates increase with increases in the concentration rate, until a plateau oxidation rate is reached. The oxidation rate remains at that plateau as contaminant concentration continues to increase. As this highly contaminated recirculating volume of gas passes through the photocatalytic gas purifier, oxidation occurs at a relatively rapid rate. The rapid oxidation rate continues until the contaminant concentration drops back to low levels. By that time, if parameters such as the size of the fixed volume and the adsorbent bed regeneration temperature were selected properly, the majority of the contaminants, and preferably at least 75% of the contaminants captured by the adsorbent bed will have been destroyed at a relatively rapid rate. For purposes of this invention, a "relatively rapid rate" means at least ten times faster than the rate of photocatalytic oxidation that would occur at the initial contaminant concentration levels of the gas stream to be cleaned. This permits the use of smaller and thus less costly photocatalytic gas purifier equipment than would otherwise be required if the external contaminated gas were to be continuously cleaned at low oxidation rates by a single pass through a photocatalytic gas purifier.

Another advantage of the present invention is the elimination of the effort and cost associated with replacing the adsorbent bed, since it is regenerated in situ. Also, because the cleaning period between regenerations may be short, for example daily or weekly, a much smaller adsorbent mass may be used. If adsorbent technology alone were utilized to remove the contaminated gas, the adsorbent mass might need to be large enough to last for many months or even years.

In sum, the present invention uniquely combines two different technologies for removing contaminants from a gas to produce a favorable synergistic effect while minimizing the negative aspects that would arise if those technologies were used independently.

The foregoing and other features and advantages of the present invention will become clear from the following description.

BEST MODE FOR CARRYING OUT THE INVENTION

Figure 1:
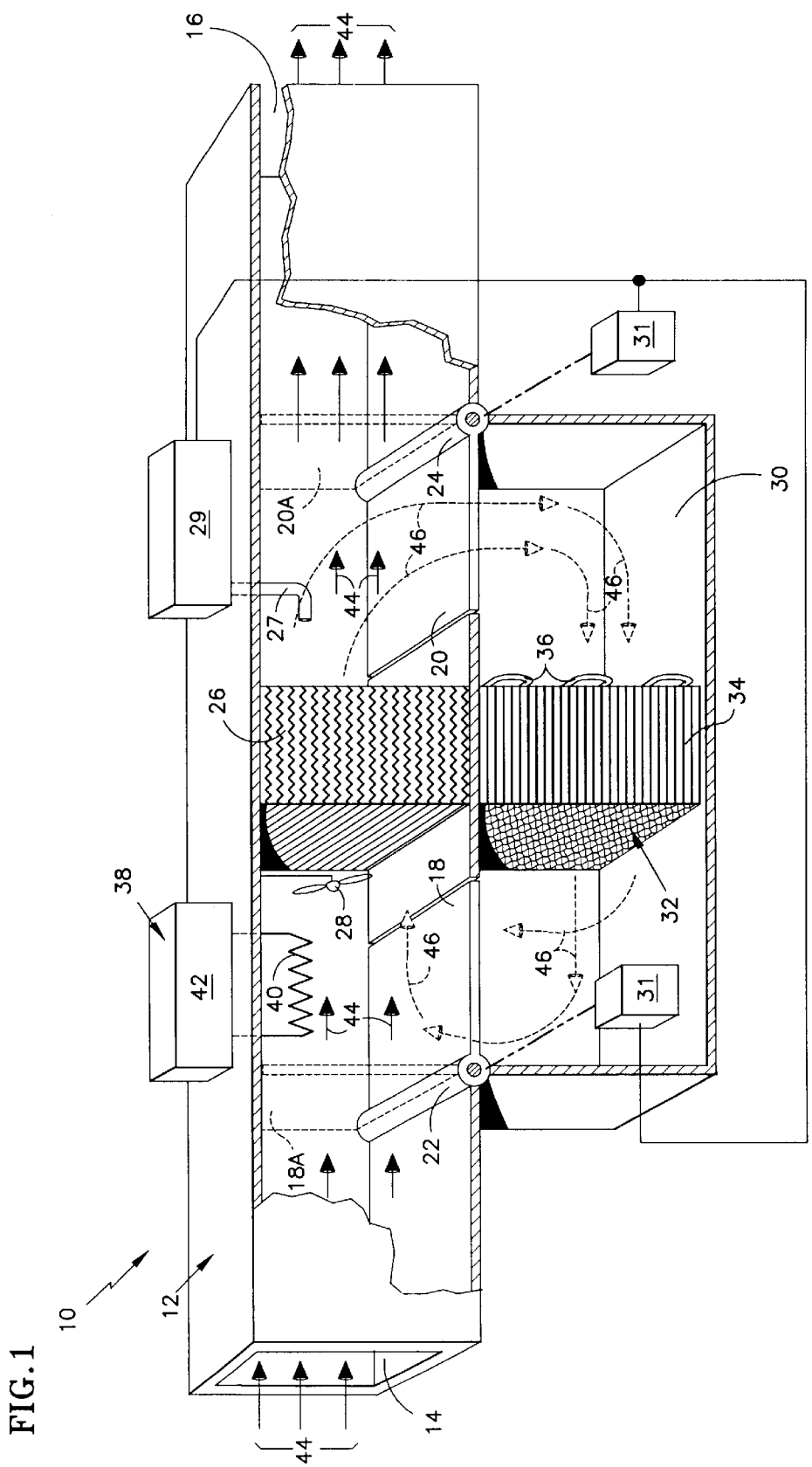
FIG. 1 is a simplified, partially schematic cross-section of a regenerable system for removing contaminants from a gas stream in accordance with one embodiment of the present invention.

Regenerable apparatus 10 for removing contaminants from an air stream in accordance with the present invention is shown in FIG. 1. The apparatus 10 is comprised of a sheet metal enclosure 12 having an inlet 14 and an outlet 16. Doors 18, 20 are disposed within the enclosure 12 and have hinges 22, 24, respectively. The doors are moveable between a first position shown with solid lines and a second position (labeled 18A and 20A) shown with dotted lines.

When the doors are in their first position, the doors and enclosure walls define an open flow path from the inlet 14 to the outlet 16. (Hereinafter and in the claims this is referred to as the "open configuration".) Disposed within that flow path is an adsorbent bed 26, a contaminant detector 27 (such as a total hydrocarbon sensor) immediately downstream of the bed, and a fan 28. The detector is connected to a control 29.

When the doors 18, 20 are in their second position they define, in conjunction with the walls of the enclosure 12, an enclosed regeneration compartment 30 within the enclosure 12. (Hereinafter in the claims this is referred to as the "closed configuration".) The compartment 30 has a fixed volume. Disposed within the fixed volume regeneration compartment 30 is a photocatalytic air purifier 32, comprising a catalyst bed 34 and ultraviolet lamps 36. Also disposed within the compartment 30 is a heater 38 represented schematically by a resistor 40 and power source 42. This heater 38 offers supplementary heating to the heating effect by the ultraviolet lamps 36. The adsorbent bed 26 and fan 28 are also located within the compartment 30.

In operation, when the doors 18, 20 are in their first position, the fan 28 (or other pumping mechanism) draws contaminated air into the inlet 14 of the apparatus 10 and moves it along the open flow path, through the adsorbent bed 26 and out the outlet 16. The solid arrows 44 represent this gas stream. The contaminated air may be from the space within a home, office building, aircraft cabin, or from some other source external of the apparatus 10. As the gas or air stream passes through the adsorbent bed, the contaminants are captured within the bed, and clean air leaves the apparatus 10 via the outlet 16 and is returned to the space being cleaned. The bed may be made from activated carbon, molecular-sieve carbon, activated aluminas, silica gel, alumino-silicates (e.g., zeolites), synthetic carbonaceous adsorbents, porous resin, phenolic, or other materials known to adsorb the particular gaseous contaminants within the gas stream. Such adsorbents are well known in the art. Combinations or mixtures of those adsorbents may also be used to enable the removal of a wider variety of gaseous contaminants.

After a predetermined period of time, or when a sensor, such as the contaminant detector 27, detects an unacceptable level of contaminants in the air exiting the bed 26, a control, such as the control 29 and associated door motors 31, causes the doors to move to their second position. This prevents further external contaminated air from entering the apparatus 10, and creates the fixed volume regeneration compartment 30. The control 29 (through appropriate electrical connections or their equivalents, not shown in the drawing) also activates the heater 38 and turns on the ultraviolet lamps 36. The control 29 maintains the temperature of the regeneration compartment 30 by controlling the heat released by the heater 38 and/or by controlling the number of activated ultraviolet lamps 36. The fan 28 now continuously circulates the air within the compartment 30 in a loop through the adsorbent bed and then through the catalyst bed 34 of the air purifier 32, and back through the adsorbent bed. That recirculation of the air within the compartment 30 is represented by the dotted arrows 46. It may be possible to create a recirculation without the use of a fan, such as by inducing natural convection by setting up a temperature gradient. Regeneration would take longer under such circumstance, but might be acceptable for certain applications.

The heater 38 and ultraviolet lamps 36 heat the circulating air and thus the adsorbent bed. As the temperature of the adsorbent bed increases, it gives up captured contaminants; and the concentration of those contaminants builds within the fixed volume of recirculating air. As the contaminants pass through the catalyst bed of the air purifier they are photocatalytically oxidized. The rate of oxidation increases as the contaminant concentration within the recirculating volume of gas increases, up to a maximum rate or plateau for each contaminant. The actual oxidation rate and the maximum oxidation rate will be dependent upon the particular contaminant and the amounts of each contaminant adsorbed and subsequently released from the adsorbent bed into the fixed volume of the compartment 30.

After another predetermined period of time, or when the detector 27 senses that the level of contaminants in the recirculating air is below a predetermined level, the heater 38 and ultraviolet lamps 36 are turned off and the adsorbent bed, which has now been regenerated, is allowed to cool. The control 29 and motors 31 then moves the doors 18, 20 to their first position and the external contaminated air once again begins to flow through the adsorbent bed of the apparatus 10.

Although a heater 38 is used in the embodiment of FIG. 1 to supplement the heat generated by the UV lamps 36, the UV lamps 36 give off considerable heat and might, in and of themselves, be able to heat the adsorbent bed to a sufficiently high temperature without the need for another heat source. As a minimum, the heat generated by the lamps would be taken into consideration when sizing the heater 38. The precise method of heating the bed is not critical to the present invention. For example, infrared irradiation or microwaves could be used. If the material making up the adsorbent bed is electrically conductive, such as electrically conductive activated carbon fibers, the bed could be heated by passing a current through the adsorbent material of the bed itself.

Although in this embodiment a contaminant detector 27 and its associated control 29 is used to switch the apparatus from its air cleaning mode to its regeneration mode, such a detector may not be required. For example, if the adsorbent bed is appropriately sized to enable it to continuously clean the air in an office building during the period of time that the building is occupied, regeneration may be set to automatically occur at night while the building is unoccupied. Alternatively, several of the apparatus 10 may be used. While one unit is cleaning the air, the other unit would be regenerating the adsorbent bed. The amount of time needed for regeneration, and the size and number of units needed to assure continuous and sufficient cleaning of the air while other units are regenerating may be readily determined.

As discussed above, adsorbent beds useful in the present invention for the removal of gaseous contaminants are well known in the art. A preferred and common wide spectrum adsorbent material is activated carbon (such as manufactured by Calgon), which strongly adsorbs high molecular weight (greater than about 50) hetero-atoms such as toluene, butanone, decane, ethanol, indole, mercaptans, naphthalene, and pyridine. The adsorbent device may be constructed as a packed bed of activated carbon granules, activated granules supported on the matrix (e.g., Farr-PS™ sold by FARR or Ultra-Sorb™ sold by Columbus Industries), or activated carbon cloth (e.g., PLW™ and DLW™ sold by Calgon) supported by a wire mesh.

Photocatalytic air-purifiers that may be used in the present invention are also well known in the art and are commercially available. One such commercially available gas purifier is made by AIRTECH International Group, Inc. and uses titania ($TiO_2$) as the catalyst.

The titania catalyst works well and is preferred for contaminants that are strongly adsorbed on the polar titania surface; however other photocatalytic catalysts may be used, such as oxides of Cu, Zn, La, Mo, V, Sr, Ba, Ce, Sn, Fe, W, Mg and Al and noble metals. Any of the several kinds of UV lamps may be used: black light lamps; germicidal lamps; ozone generating lamps; or a mix of these lamps. The kind of UV lamp used is not critical to the present invention, and would be selected based upon economic optimization. If ozone-generating lamps are used, environmental factors must be considered since it is not desirable to return ozone to the building air. The embodiment of FIG. 1 provides an opportunity to use ozone generating lamps alone or in combination with the other UV lamp types, if desired, since the ozone is generated within a confined space. The use of ozone generating lamps may be beneficial to the cleaning process because the ozone itself oxidizes certain contaminants. Ozone production does not present a problem where the catalyst is titania, since the ozone is oxidized by the titania.

Figure 3:
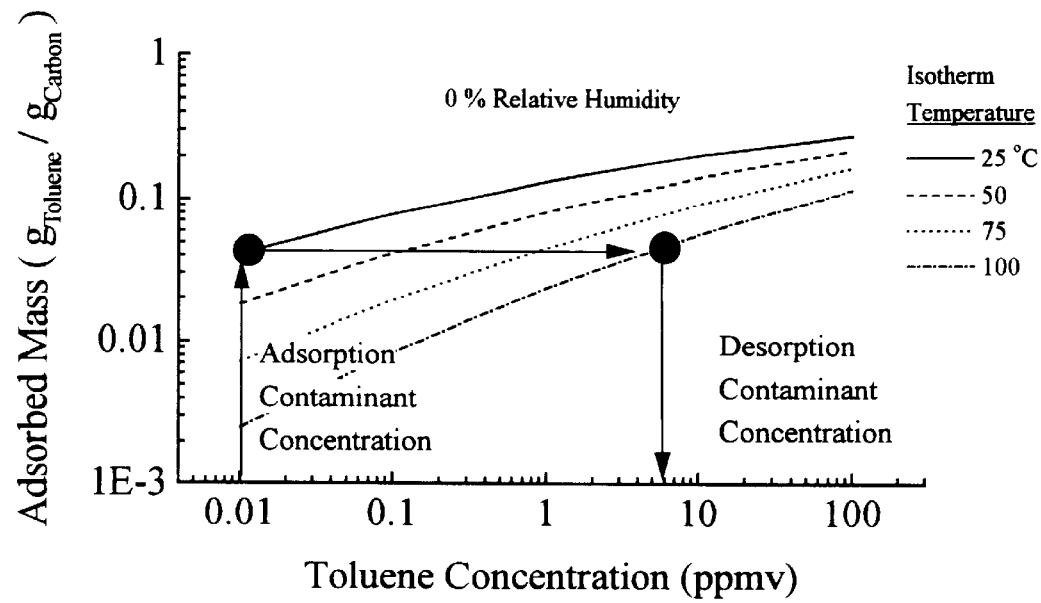
FIG. 3 is a graph showing, for activated carbon, the affect of temperature on the mass of toluene activated carbon can adsorb (per unit activated carbon mass) from air streams having various concentrations of toluene therein.

By way of example, and to help explain the method and apparatus of the present invention, reference is made to FIG. 3. FIG. 3 shows the influence of temperature on the adsorption isotherm of toluene on an adsorbent bed of activated carbon at a relative humidity of 0.0%. (Note: Toluene was used as a surrogate contaminant in laboratory experiments for purposes of safety and convenience and because it is a typical building air contaminant. A similar effect and benefit will occur for most gaseous contaminants typically found in building air.) If it is assumed that building air at a temperature of 25° C. has a toluene concentration of 0.01 ppm, then the adsorbent mass adsorbs (removes) toluene from the building air during the air cleaning period and will be able to collect a maximum toluene mass (adsorbed mass) at saturation of about 0.05 g per gram of activated carbon, as shown in FIG. 3 along the 25° C. isotherm. This saturation condition may be detected using the contaminant detector 27 in FIG. 1. For this example assume that, upon saturation, the doors are moved to their second position and regeneration of the adsorbent bed is initiated. During the regeneration period the heater 38 is turned on causing the adsorbent temperature to quickly rise. If the heating process is controlled so that the adsorbent temperature rises to 100° C. (the desorption temperature selected for this example), there is a shift from the 25° C. isotherm to the 100° C. isotherm (see FIG. 3), and previously adsorbed toluene is thermodynamically released into the fixed volume of the compartment 30. As shown in FIG. 3, the desorption event fills the compartment 30 with toluene until the gaseous toluene reaches equilibrium with the adsorbed toluene at a concentration of about 6.0 ppm. The resultant gaseous toluene concentration is determined and controlled by the amount of toluene adsorbed, the mass of the adsorbent, the size of the fixed volume into which it is desorbed, and the desorption temperature. In this example, the toluene concentration has been elevated by a factor of about 600 compared to the toluene concentration level of 0.01 ppm typical for contaminated, untreated building air. Although any significant increase in contaminant concentration levels over the initial contaminant concentration level in the gas stream to be cleaned will increase the rate of catalytic oxidation during regeneration, increases by a factor of at least ten may be necessary for some contaminants in certain applications in order to make the use of this invention economically attractive.

Figure 4:
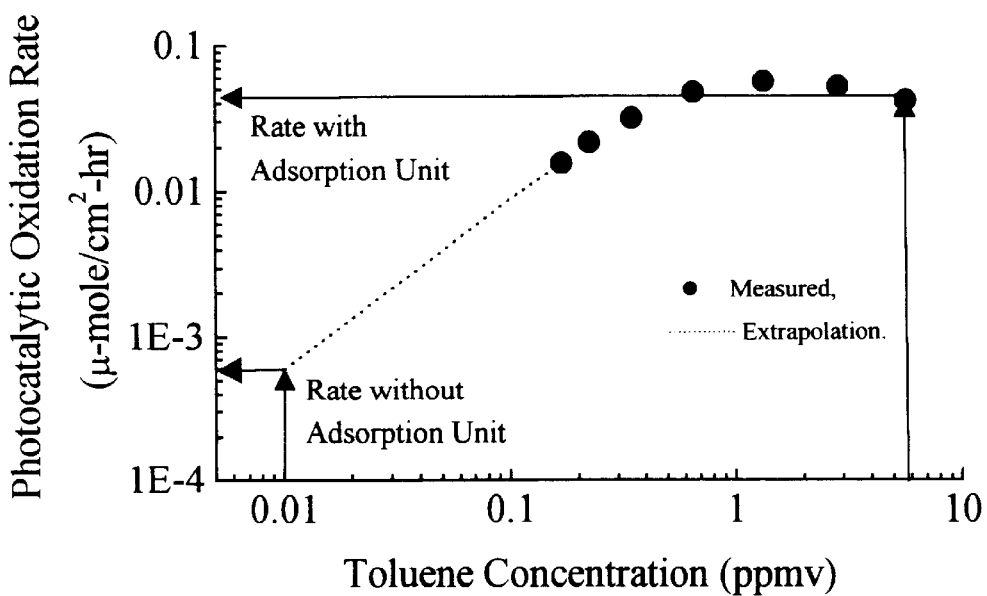
FIG. 4 is a graph showing the relationship between the rate of photocatalytic oxidation of toluene and the concentration of toluene in the air being subject to photocatalytic oxidation.

Turning to FIG. 4, the intrinsic oxidation rate of toluene per square centimeter surface area of the photocatalyst titania in an ultraviolet photocatalytic air purifier is shown for different toluene concentrations in the air passing through the purifier. The solid portion of the graph is based upon actual measurements, and the dotted portion of the graph is extrapolated based upon well-known Langmuir-Hinshelwood kinetics. The level of ultraviolet irradiation used was 1.0 milliwatts per $cm^2$ of photocatalytic surface area. The graph shows that the rate of photocatalytic oxidation for the concentration levels of toluene that might be expected in building air (for this example, it is assumed to be 0.01 ppm, by volume) is only 0.0006 $\mu$-moles per $cm^2$-hr. That would be the oxidation rate if the air purifier were used to directly clean the air without the use of an adsorbtion unit. The oxidation rate increases to about 0.05 $\mu$-moles per $cm^2$-hr at a toluene concentration of about 6.0 ppm when the air purifier is operating in combination with the adsorbtion unit during the regeneration of the adsorbent bed. That is an 83-fold increase in the oxidation rate. As the toluene is photocatalytically mineralized (to carbon dioxide and water), the adsorbed toluene mass decreases along the 100° C. isotherm in FIG. 3. The toluene gas concentration, in equilibrium with the adsorbed toluene mass, also decreases along the 100° C. isotherm. When the toluene gas concentration drops to about 0.5 ppm, the oxidation rate, which had been fairly constant at about 0.05 $\mu$-moles per $cm^2$-hr (see FIG. 4), begins to diminish. When the toluene gas concentration reaches 0.1 ppm, the adsorbed toluene mass has dropped to 0.008 g/g and the oxidation rate is now 0.01 $\mu$-moles per $cm^2$-hr. Thus, the adsorbed toluene mass is reduced by a factor of 6.25 (from about 0.05 g/g to 0.008 g/g). During this time period, the factor by which the oxidation rate is increased, which was initially a factor of 83, decreases to a factor of 17. The critical effect is that, at higher concentrations more toluene mass is oxidized at a much higher rate (FIG. 4) than would occur at the initial toluene concentration levels found in the untreated, contaminated air. It is for that reason that a much smaller photocatalytic reactor may be used.

The above example for toluene demonstrates the primary benefits resulting from the combined use of an adsorbent bed and photocatalytic air purifier in accordance with the present invention. First, a smaller adsorbent bed 26 may be used: one of sufficient adsorptive capacity for the air-cleaning periods between regeneration periods. If used in an office building where regeneration may be done during the evening hours when the building is essentially unoccupied, the bed need only have the capacity to operate continuously for perhaps 14 to 16 hours. Second, the adsorbent bed need not be replaced, since it is regenerated in situ. And, third, the required size of the photocatalytic air purifier is greatly reduced due to the large increase in the contaminant concentration passing through it (above the level in untreated building air) during regeneration of the adsorbent bed.

Figure 5:
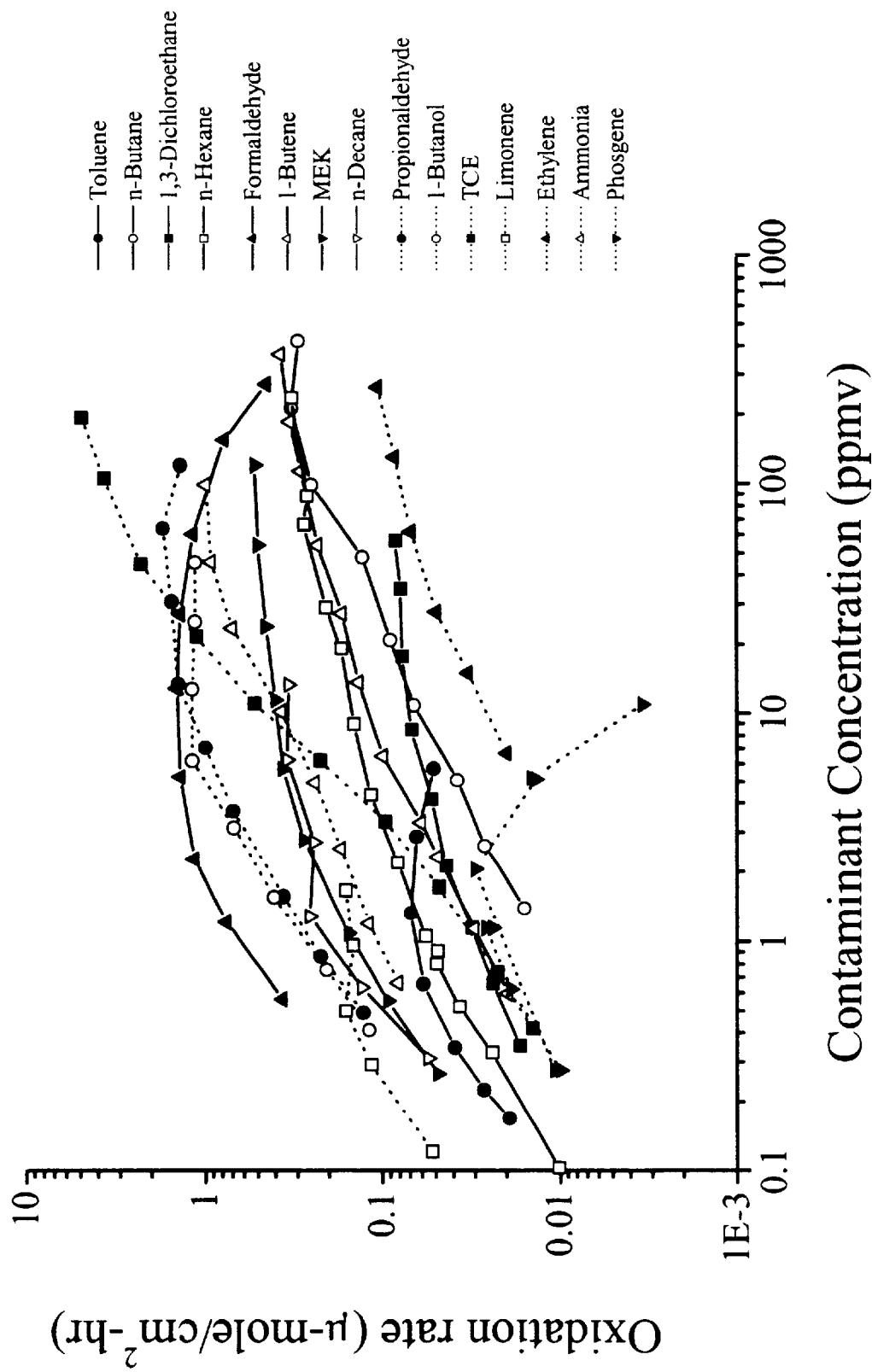
FIG. 5 is a graph similar to the graph of FIG. 4, but for selected contaminants other than toluene.

FIG. 5 is a graph like that of FIG. 4, but showing the relationship between photocatalytic oxidation rate and contaminant concentration for toluene as well as several other gaseous contaminants. The graphs for each contaminant are based on actual measurements using 1.0 milliwatt per $cm^2$ of UV irradiation. It can be seen that, at lower concentration levels, the oxidation rate for each contaminant increases substantially linearly with increasing concentration level. With few exceptions, the oxidation rate either continues to increase or at least remains at a relatively high level as concentration levels increase well beyond those found in contaminated, untreated building air, which levels are typically within the range of 0.001 to 0.1 ppm.

The synergistic interaction between the two filtering technologies (contaminant adsorption and photocatalytic oxidation) used in the manner of the present invention is a direct consequence of the functional dependence between the photocatalytic oxidation rate and contaminant concentration, which is illustrated in FIG. 4 for toluene and for other contaminants in FIG. 5. Specifically, the synergistic effect occurs for two reasons: First, the photocatalytic oxidation process obeys Langmuir-Hinshelwood (L-H) kinetics; and, second, for contaminant levels typically found in indoor air, the oxidative rates lie in the linear region of the L-H curve. As shown in FIG. 5, depending upon the individual contaminant specie, the curves are linear for contaminant concentrations lying below about 1 to 10 ppm. In FIG. 5 only actual measured points are plotted for each specie. Based upon L-H kinetics, each curve would continue to extend to the left as a straight line at essentially the same slope as is presently shown for the left ends of each respective curve. This is illustrated for toluene in the graph of FIG. 4.

Figure 2:
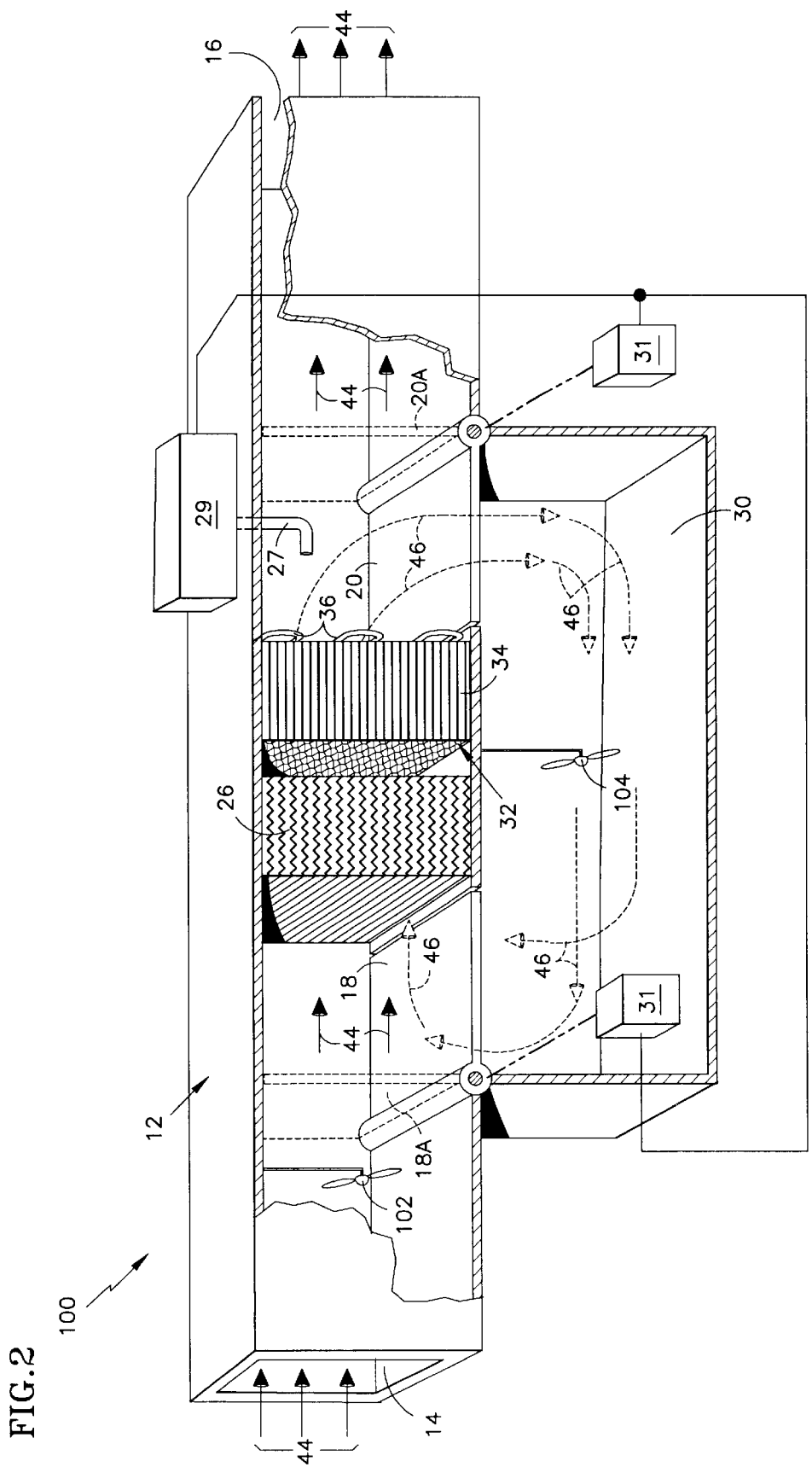
FIG. 2 is a simplified, partially schematic cross-section of a regenerable system for removing contaminants from a gas stream in accordance with another embodiment of the present invention.

An alternate embodiment of the present invention is shown in FIG. 2. In this embodiment the apparatus for cleaning a contaminated gas stream is designated by the reference numeral 100. Elements of the apparatus 100 that are the same as those shown in the embodiment of FIG. 1 are given the same reference numerals as used in FIG. 1. The primary difference between the embodiments of FIGS. 1 and 2 is that in the embodiment of FIG. 2 the photocatalytic gas purifier 32 is located immediately downstream of the adsorbent bed 26 and within the open gas flow path from the inlet 14 to the outlet 16 that exists when the doors 18, 20 are in their first position. A fan 102, located in that gas stream, moves the contaminated gas stream from the inlet, through both the adsorbent bed 26 and the gas purifier 32, and out the outlet 16. When the doors 18, 20 are in their second position, a fan 104 circulates the gases within the fixed volume compartment 30 through the adsorbent bed and gas purifier, as represented by the dotted arrows 46. The number and location of the fans or other means for moving the gas through the apparatus 100 or to recirculate the gas within the compartment 30 is not critical to the present invention. No heater is shown in this embodiment, it being assumed that the ultraviolet lamps 36 will provide all the heat needed to increase the temperature of the bed 26 during regeneration. A supplemental heater could be added if required. The UV lamps 36 of the gas purifier 32 remain on during both the cleaning mode and the regeneration mode.

During the air-cleaning mode the adsorbent bed operates in series with the photocatalytic air purifier. The adsorbent materials are selected such that they do not remove (i.e. adsorb) the highly volatile contaminants, such as low molecular weight aldehydes, ketones, and alcohols, which are susceptible to the highest photocatalytic oxidation rates at low concentrations (see FIG. 5). For example, activated carbon itself offers such weak adsorption for aldehydes, that it does not effectively remove this chemical family. The air purifier is sized to oxidize these latter contaminants during the air-cleaning mode. Those contaminants adsorbed by the bed 26 are destroyed during the regeneration mode in the manner described with respect to the embodiment of FIG. 1.

It is also contemplated that water vapor may be added to the compartment 30 during the regeneration cycle of the present invention to increase the contaminant desorption rate since water vapor takes up catalyst sites in the bed and prevents the released contaminants from reattaching to those sites during regeneration. While the addition of water vapor may be detrimental to the photocatalytic process, it is believed that the right amount of water vapor will produce a net economic benefit.

This invention may also be used to clean gases other than air of gaseous contaminants, as long as the appropriate adsorbent bed material and UV activated catalyst are selected. For example it may be used to remove ethylene from the food storage area of a refrigerated truck or other refrigerated space. Refrigerated fruit gives off ethylene as it ripens; and that gas further speeds the ripening process. The present invention could be used to remove the ethylene as it is produced. An adsorbent material that would be useful for such an application is zeolite. A titania photocatalyst would be able to oxidize the ethylene during regeneration.

Although the invention has been shown and described with respect to detailed embodiments thereof, it will be understood by those skilled in the art that various changes in form and detail thereof may be made without departing form the spirit and scope of the claimed invention.

What is claimed is:

1. A process for improving the quality of indoor air by removing the gaseous contaminants therefrom comprising the steps of:

(a) passing the contaminated indoor air through an adsorbent bed to adsorb said gaseous contaminants;
(b) heating the said adsorbent bed from step (a) in a confined space to release said gaseous contaminants in said confined space, and regenerating said spent adsorbent bed from step (a);
(c) choosing the dimensions of said confined space such that the individual concentrations of said gaseous contaminants released from said adsorbent bed in step (b) are within the range of about 0.1 to 10 ppm by volume;
(d) using linear dependence of the photo-catalytic oxidation rate on concentration in the presence of a photo-catalyst in said concentration range of about 0.1 to 10 ppm by volume to quickly photo-catalytically oxidize said gaseous contaminants; and
(e) repeating steps (a) through (d) a plurality of times.

2. The method of claim 1, wherein said gaseous contaminants are selected from the group consisting of toluene, butane, formaldehyde, methyl ethyl ketone, n-decane, propionaldehyde, 1-butanol, limonene, ethylene, ammonia and phosgene.

3. The method of claim 1, where said adsorbent bed contains a single adsorbent material.

4. The method of claim 1, where said adsorbent bed contains multiple adsorbent materials.

5. The method of claim 1, where said photo-catalyst is $TiO_2$.

6. The method of claim 1, where said photo-catalyst is selected from the group consisting of oxides of Cu, Zn, La, Mo, V, Sr, Ba, Ce, Sn, Fe, W, Mg and Al.

7. The method of claim 1, where said photo-catalytic oxidation is carried out using uv radiation.

8. The method of claim 1, where said uv radiation is of wavelength 250 nm.

9. The methods of claims 1, where the humidity level in said confined space is between 0 and 100%.

* * * * *